United States Patent
Yun

(10) Patent No.: US 8,264,808 B2
(45) Date of Patent: Sep. 11, 2012

(54) MODULE APPARATUS FOR SOLAR CELL

(75) Inventor: Chang Sun Yun, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 518 days.

(21) Appl. No.: 12/624,707

(22) Filed: Nov. 24, 2009

(65) Prior Publication Data

US 2010/0126585 A1    May 27, 2010

(30) Foreign Application Priority Data

Nov. 24, 2008 (KR) .................. 10-2008-0116869

(51) Int. Cl.
*H02H 5/00* (2006.01)
(52) U.S. Cl. .................................... 361/103
(58) Field of Classification Search .............. 361/103
See application file for complete search history.

(56) References Cited

U.S. PATENT DOCUMENTS

| | | | | |
|---|---|---|---|---|
| 6,750,391 B2 * | 6/2004 | Bower et al. | ................. | 136/244 |
| 7,342,171 B2 * | 3/2008 | Khouri et al. | ................. | 136/245 |
| 7,817,419 B2 * | 10/2010 | Illerhaus | ..................... | 361/692 |
| 8,023,266 B2 * | 9/2011 | Russell et al. | ............... | 361/702 |

\* cited by examiner

*Primary Examiner* — Stephen W Jackson
(74) *Attorney, Agent, or Firm* — Saliswanchik, Lloyd & Eisenschenk

(57) ABSTRACT

A solar cell unit is disclosed, wherein the solar cell module includes a solar cell unit converting light from the sun to a DC voltage and outputting the converted DC voltage; an inverting unit inverting the outputted DC voltage to an AC voltage; and an inverting outdoor unit protecting the inverting unit from outdoor space, wherein the inverting outdoor unit includes: a heat emitting unit emitting heat generated from the inverting outdoor unit or the inverting unit; and a thermal expansion protecting unit keeping temperature equilibrium between the inverting unit and the inverting outdoor unit.

7 Claims, 2 Drawing Sheets

MODULE APPARATUS FOR SOLAR CELL

CROSS-REFERENCE TO RELATED APPLICATION

This application claims the benefit under 35 U.S.C. §119 of Korean Patent Application No. 10-2008-0116869, filed Nov. 24, 2008, which is hereby incorporated by reference in its entirety.

BACKGROUND OF THE INVENTION

1. Field of the Invention

The present invention relates to a solar cell module.

2. Description of the Related Art

A solar photovoltaic technology is generally a technology for generating electric power using solar energy. That is, light energy supplied from the sun is converted to electric energy using an electric converting apparatus. The use efficiency of solar energy is more than that of thermal system since the solar photovoltaic technology use a limited amount of light to allow being used even on cloudy days.

A power generating system using the solar photovoltaic technology employs various methods or apparatus in order to enhance system efficiency and reduce capacity to a maximum. One of ideas is to reduce the number of elements used in the power generating system.

BRIEF SUMMARY

According to some exemplary implementations, there is provided a solar cell module capable of efficiently emitting heat generated from a solar cell unit and an inverting unit by employing a heat emitting unit and a thermal expansion protecting unit.

In one general aspect of the present disclosure, there is provided a solar cell module including a solar cell unit converting light from the sun to a DC voltage and outputting the converted DC voltage, an inverting unit inverting the outputted DC voltage to an AC voltage, and an inverting outdoor unit protecting the inverting unit from an external side, wherein the inverting outdoor unit includes: a heat emitting unit emitting heat generated from the inverting outdoor unit or the inverting unit, and a thermal expansion protecting unit keeping a temperature equilibrium between the inverting unit and the inverting outdoor unit.

DETAILED DESCRIPTION

Exemplary implementations of the present disclosure will be described with reference to the accompanying drawings.

Figure 1:
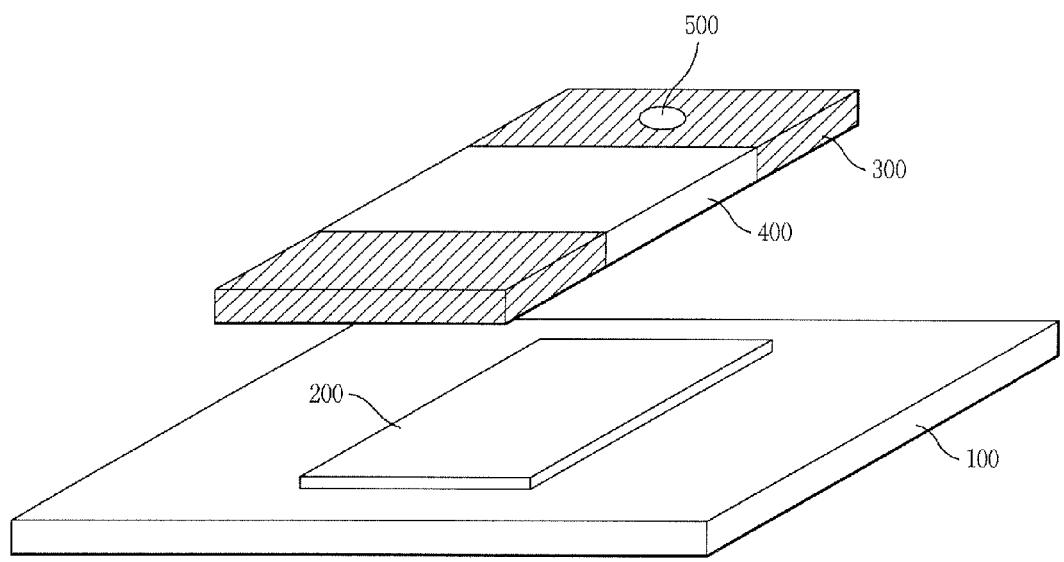
FIG. 1 is a block diagram of a solar cell module according to the present invention.

FIG. 1 is a block diagram of a solar cell module according to the present invention.

As shown, the solar cell module includes a solar cell unit 100, an inverting unit 200, and an inverting outdoor unit 300.

The solar cell unit 100 stores solar light from the sun at solar cells and converts the stored solar light to DC voltage. The solar cell unit 100 first converts solar light from the sun to DC voltage and then, stores the converted DC voltage. The DC voltage stored in the solar cells can be outputted if it necessary.

The inverting unit 200 can invert the DC voltage outputted from the solar cell unit 100 to AC voltage. The inverting unit 200 may include a solar cell switch when it is adapted in another circumstance. Since the inverting unit 200 can invert the DC voltage to an AC outputted from the solar cell unit 100, it is possible to reduce set-up cost and maintenance cost for using a DC voltage as a general supply voltage and to enhance efficiency for operating the solar cells. The inversion from a DC voltage to an AC voltage will be described with reference to FIG. 2.

The inverting outdoor unit 300 protects the inverting unit 200 from outdoor environment. That is, the inverting outdoor unit 300 can protect the inverting unit 200 against rain, snow, wind or dust.

The inverting outdoor unit 300 includes a heat emitting unit 400 of solar cell inverting unit 200 and a thermal expansion protecting unit 500. The heat emitting unit 400 can emit heat generated by the inverting unit 200. The thermal expansion protecting unit 500 maintains an equal temperature between the inverting unit 200 and the inverting outdoor unit 300 to thereby keep equilibrium.

It is possible to protect the inverting unit 200 from indoor or outdoor environment because the inverting outdoor unit 300 wraps the inverting unit 200, a more detailed explanation of which will be given with reference to FIG. 3.

Figure 2:
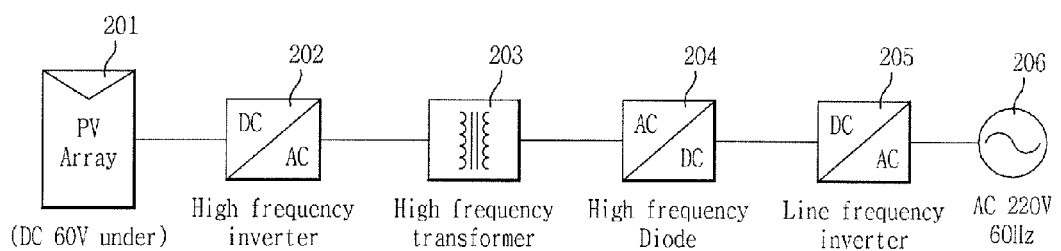
FIG. 2 is a block diagram for illustrating an inverting unit of a solar cell according to the present invention.

FIG. 2 is a block diagram for illustrating an inverting unit of a solar cell according to the present invention.

As shown, the inverting unit 200 includes a PV array 201, a high frequency inverter 202, a high frequency transformer 203, a high frequency diode 204, a line frequency inverter 205, and a power supplier 206.

The PV (Photovoltaic) array 201 includes array of photoelectric cells. The operating voltage of the PV array 201 is less than 60V or may be more than 60V if it is necessary to simplify circuit configuration of the inverting unit 200.

The high frequency inverter 202 inverts a DC voltage inputted from the PV array 201 to an AC voltage and can also perform a high frequency transformation.

The high frequency transformer 203 transforms the AC voltage from the high frequency inverter 202 to another AC voltage and can also perform a high frequency transformation.

The high frequency diode 204 rectifies the AC voltage from the high frequency transformer 203 to output a DC voltage.

The line frequency inverter 205 inverts the rectified voltage to an AC voltage.

The power supplier 206 supplies an AC voltage.

Since the inverting unit 200 having the configuration like above description includes elements operating at a high frequency, the inverting unit 200 has a merit in terms of manufacturing cost, size, or weight. The inverting unit 200 can also keep inputted voltage high to directly invert an AC voltage. Then, the inverting unit 200 can reduce amount of current required to operate the inverting unit 200 using the high frequency inverter 202 and the line frequency inverter 205.

The configuration of the inverting unit 200 is not limited in FIG. 2 and it would be apparent to those skilled in the art that various changes may be possible. The configuration of the inverting unit 200 may be complicated or simple as long as a DC voltage can reliably converted to an AC voltage.

Figure 3:
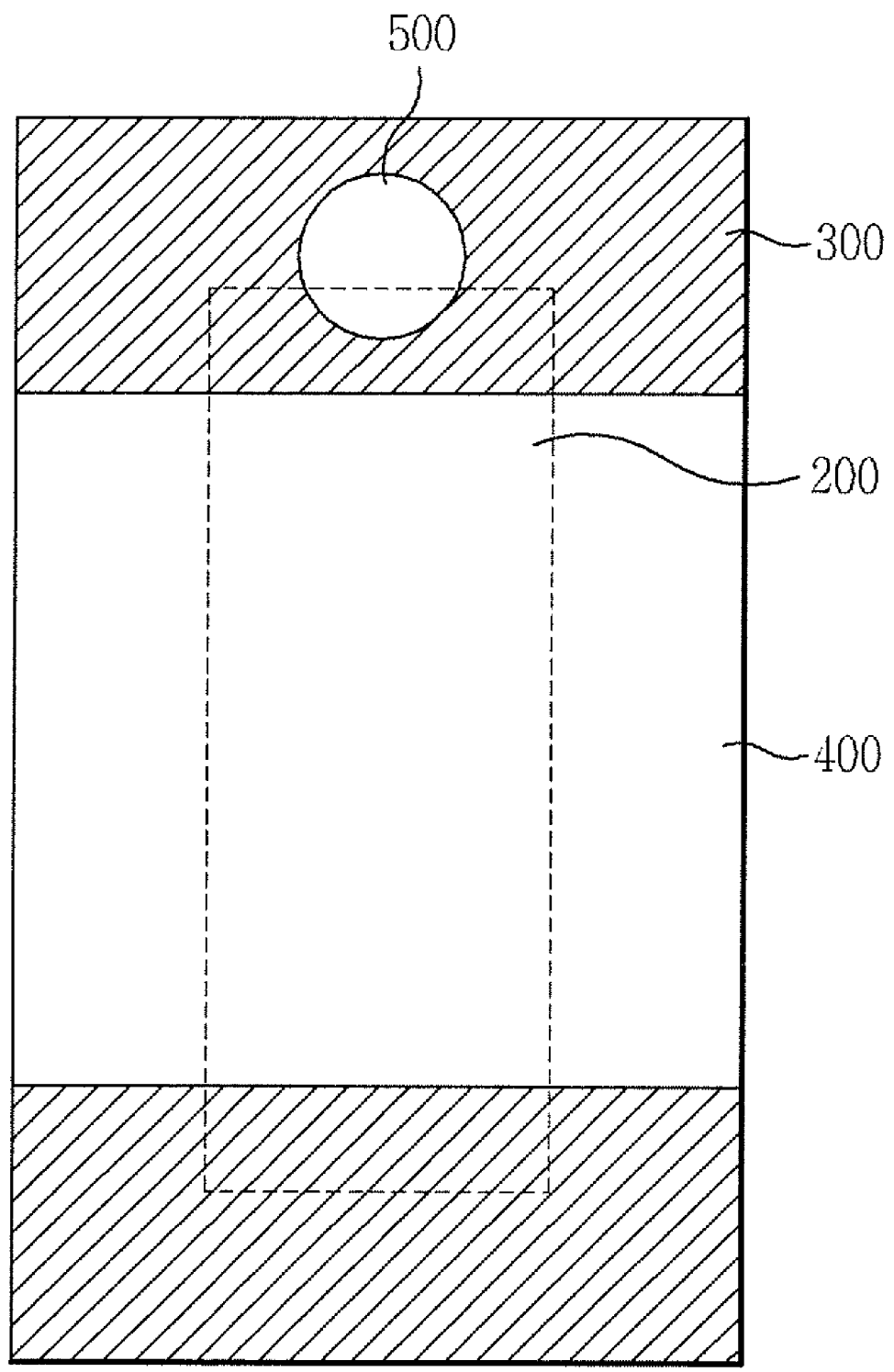
FIG. 3 is an inverting outdoor unit of a solar cell according to the present invention according to the present invention.

FIG. 3 is an inverting outdoor unit of a solar cell according to the present invention.

As shown, the inverting outdoor unit 300 includes the heat emitting unit 400 of the solar cell inverting unit 200 and the thermal expansion protecting unit 500.

The heat emitting unit 400 emits heat generated from the solar cell inverting unit 200. The area of the heat emitting unit 400 arranged in the inverting outdoor unit 300 may be more than that of the solar cell inverting unit 200. The heat emitting unit 400 can efficiently emit heat generated from the solar cell inverting unit 200 because the area of the heat emitting unit 400 is more than that of the solar cell inverting unit 200. That is, by widening emitting area of the heat emitting unit 400, the air-contacting area becomes larger to enhance the heat-emitting efficiency.

Also, in another embodiment, an area of the heat emitting unit 400 arranged in the inverting outdoor unit 300 may correspond to that of the solar cell inverting unit 200. The heat emitting unit 400 can efficiently emit heat generated from the solar cell inverting unit 200 because the area of the heat emitting unit 400 is the same as that of the solar cell inverting unit 200. That is, by corresponding the heat generating area of the solar cell inverting unit 200 to the emitting area of the heat emitting unit 400, heat emission is effected as soon as heat is generated. Thus, conduction of heat to other elements of the solar cell module can be avoided.

The heat emitting unit 400 may have conducting materials in order to enhance the heat-emitting efficiency. For instance, the conducting materials include Au, Ag, or Al.

The thermal expansion protecting unit 500 adjusts an equal temperature between the inverting unit 200 and the inverting outdoor unit 300 to thereby keep equilibrium.

A portion of the thermal expansion protecting unit 500 may overlap the inverting unit 200. Temperature equilibrium at the inside or the outside of the inverting outdoor unit 300 can be efficiently kept because the portion of the thermal expansion protecting unit 500 overlaps the inverting unit 200.

The thermal expansion protecting unit 500 can protect the inverting unit 200 against humidity or something like particles. That is, the solar cell module can protect the inverting unit 200 using humidity or something like particles using the thermal expansion protecting unit 500. Also, thermal expansion protecting unit 500 can enhance the heat emitting efficiency or reduce interferences between elements in the solar cell module. A location of the thermal expansion protecting unit 500 may be changed according to inner elements of the solar cell module.

The thermal expansion protecting unit 500 may includes a Gore membrane vent to further improve hitherto-mentioned function.

Since the solar cell module according to the present invention is formed with the inverting unit 200 that can invert a DC voltage to an AC voltage, the installation or maintenance cost of the solar cell module can be reduced Also, heat generated from inverting unit 200 can be efficiently emitted because the inverting outdoor unit 300 includes the thermal expansion protecting unit 500.

Temperature equilibrium at the inside or the outside of the inverting outdoor unit 300 can be efficiently kept because the solar cell module according to the present invention has the thermal expansion protecting unit 500.

While the present invention has been described with respect to the specific embodiments, it will be apparent to those skilled in the art that various changes and modifications may be made without departing from the spirit and scope of the invention as defined in the following claims.

What is claimed is:

1. A solar cell module, comprising:
    a solar cell unit converting light from the sun to a DC voltage and outputting the converted DC voltage;
    an inverting unit inverting the outputted DC voltage to an AC voltage; and
    an inverting outdoor unit protecting the inverting unit against outdoor space,
    wherein the inverting outdoor unit includes
    a heat emitting unit emitting heat generated from the inverting outdoor unit or the inverting unit, and
    a thermal expansion protecting unit keeping temperature equilibrium between the inverting unit and the inverting outdoor unit.

2. The solar cell module of claim 1, wherein an area of the heat emitting unit is more than that of the inverting unit.

3. The solar cell module of claim 1, wherein the area of the heat emitting unit is the same as that of the inverting unit.

4. The solar cell module of claim 1, wherein the heat emitting unit includes a conducting metal.

5. The solar cell module of claim 1, wherein the heat emitting unit overlaps portion of the inverting unit.

6. The solar cell module of claim 1, wherein the thermal expansion protecting unit protects the inverting unit against outdoor humidity or outdoor particles.

7. The solar cell module of claim 1, wherein the thermal expansion protecting unit includes a Goremembrane vent.

\* \* \* \* \*